United States Patent Office 3,310,368
Patented Mar. 21, 1967

3,310,368
PRODUCTION OF ZEOLITES AND LITHIUM SALTS
Maurice Archambault, Quebec, Quebec, Canada, assignor to Ministere des Richesses Naturelles, Province de Quebec, Quebec, Quebec, Canada
No Drawing. Filed June 14, 1963, Ser. No. 287,766
Claims priority, application Canada, June 20, 1962, 852,030
7 Claims. (Cl. 23—63)

This invention relates to the simultaneous production of lithium carbonate and anisometric sodic zeolite from calcined lithium-bearing aluminosilicates, of which beta-spodumene is a preferred species, and to the production of other lithium salts and anisometric ammoniated zeolite.

The applicant's copending United States patent application Ser. No. 73,679, filed Dec. 5, 1960, Maurice Archambault, now Patent 3,112,171, issued Nov. 26, 1963, discloses the generic concept of deriving lithium carbonate directly from calcined lithium-bearing silicate, and producing at the same time various sodium aluminosilicates as by-products. That process involves reacting said silicate under hydrothermic conditions with aqueous sodium carbonate and in the absence of other reactants, to produce a mixture containing hot water-insoluble lithium carbonate and sodium aluminosilicate or silicates, for instance anisometric sodic zeolite and separating the lithium carbonate from the silicate. Normally one would carry out such a process at as high a temperature as possible to reduce the reaction time and thus improve the economics of the process.

The applicant has now found that when special conditions are observed, the yield of anisometric sodic zeolite can be greatly improved and even the properties of the zeolite modified, thus providing certain advantages which will be discussed below. These conditions involve carrying out the reaction between the sodium carbonate, as the only treating reactant, and the lithium-bearing silicate, with the sodium carbonate in considerable excess over the stoichiometric amount to react with the lithium present in the charge, under low pressure and at a temperature not more than about 125° C. Theoretically, the temperature can range down to about 60° C., above which point anisometric sodic zeolite is obtained.

According to the invention, the reaction between the calcined lithium-bearing aluminosilicate and the sodium carbonate is carried on to the point where the lithium in the aluminosilicate is substantially all reacted to form lithium carbonate, but not beyond that point where the lithium carbonate would be broken down to other compounds. The reaction is deliberately protracted by operating at the relatively low temperature, in the face of the normal reluctance to slow down a reaction which it is known can be carried out faster. This slowing down is for the purpose of forming a special end-product, anisometric sodic zeolite, which the applicant has found is only formed at the low temperature. This product has excellent ion-exchange properties and thus a higher market value than same product formed at higher temperatures. So, while an economic advantage is lost in terms of extracting lithium carbonate alone, it is regained on the overall yield of the process, considering both the lithium and anisometric sodic zeolite values of the ore.

From a practical point of view, however, a temperature of at least about 85° C. is required, and preferably the temperature should range upwards from 90° C. The time required for decomposition of the starting silicate is usually from about one half day to about four days. The excess of the stoichiometric amount of the sodium carbonate will be substantial, i.e. within the range from about 2 to about 8 times, preferably from about 3 to about 7 times the stoichiometric amount. Water is strictly required in an amount just sufficient to ensure a good contact between the lithium-bearing silicate and sodium carbonate and is in principle calculated so as to keep the sodium carbonate solution at or near saturation point from the beginning to the end of reaction. In practice, the amount of water is preferably from about 1 to about 4 times the weight of the lithium-bearing charge. The pressure is within the range from atmospheric to about 15 p.s.i.g. Actually, the pressure is just sufficient to prevent the water from escaping the reacting vessel.

When the temperature of the decomposition step is maintained within the range from about 90° C. to about 120° C., the yield of anisometric sodic zeolite is particularly high. Moreover, the nature of the zeolite formed, within this temperature range, appears to be more amenable to sodium regeneration by an ammonium salt of carbonic acid. This is particularly advantageous in a cyclic process based on sodium regeneration as explained later.

The effect of temperature on the decomposition time is briefly illustrated as follows:

from 90 to 105° C., decomposition takes from 2 to 3.5 days
from 90 to 120° C., decomposition takes from 1 to 3.5 days
from 90 to 125° C., decomposition takes from 0.5 to 3.5 days
from 105 to 125° C., decomposition takes from 0.5 to 2 days.

Once the decomposition has been thus achieved, the mother liquor containing the unspent $Na_2CO_3$ is separated from the hot aqueous mixture, which is usually a slurry, for example, by decantation, filtration or centrifugation. The separated solids are then leached at a temperature from about 0° C. to about 40° C. with water containing a leaching promoter selected from the group consisting of carbon dioxide and ammonium carbonates, as disclosed in copending United States patent applications Ser. No. 73,679, filed Dec. 5, 1960, Maurice Archambault, now Patent 3,112,171, and Ser. No. 81,225 filed Jan. 9, 1961, Maurice Archambault, now Patent 3,131,022, issued Apr. 28, 1964. Whatever the leaching promoter used, the water required is in an amount ranging from about 25 to about 200 times the weight of the lithium oxide present in the charge, or to put it otherwise, water is in an amount varying from about 0.5 to about 16 times the weight of the lithium-bearing silicate. When the leaching promoter is an ammonium salt of carbonic acid it is employed in an amount from about 3 to about 20 times the weight of the lithium oxide present in the charge. When carbon dioxide is selected as the leaching promoter it is added in any amount sufficient to increase materially the natural solubility of lithium carbonate in cold water and also to make sure that any undesirable impurities are prevented from going into solution. Desirably, carbon dioxide is employed in an amount from about 0.35 to about 1.7 times the weight of the lithium oxide present in the charge.

The residual leached solids are filtered and the clear filtrate, containing the lithium carbonate, is agitated and heated at a temperature from about 60° C. to about 100° C., for example, by blowing superheated steam through it. This drives off the leaching promoter in gaseous form, thereby insolubilizing crystalline lithium carbonate. The lithium carbonate is separated from the mother liquor, for example, by decantation, filtration or centrifugation.

The solid residue left after the leaching step is predominantly anisometric zeolite, and is recovered as a useful end-product. It is an ammoniated zeolite, when leaching has been effected with an aqueous ammonium salt of carbonic acid. Otherwise, it is a sodic zeolite, i.e., when the leaching is in the absence of an ammonium carbonate. The unspent solution resulting from the decomposing step, where a cyclic process is employed.

Likewise, the leading promoter in gaseous form, evolved in the insolubilizing step, may be returned to the leaching step. When an ammoniated zeolite is formed, its ammonium component can be recovered and returned to the leaching step, for example, by heating said zeolite, as disclosed in United States Patent 3,112,171.

Even though one obtains lithium carbonate quicker at the higher temperature, the present invention makes is possible, by slowing the process down, to get a higher yield of a more marketable product than that obtained by the higher temperature process. This may make the lower temperature and slower process more economic. The anisometric sodic zeolite obtained at low temperature is advantageous for the reason that it has better ion-exchange properties and gives up its sodium much more readily under leaching with an ammonium carbonate. So, from the point of view of recovering the sodium and recycling it, a yield of this low-temperature end product is an advantage over the yield of end products obtained at higher temperature. Further, the anisometric zeolite obtained at the low temperature is more easily filterable and leachable, making the operation of the process less laborious.

The invention also contemplates recovering the residual solid ammoniated zeolite from the lithium-bearing solution, this particular zeolite offering good marketing possibilities inter alia in horticulture as a delayed action fertilizer. The invention contemplates also treating the lithium-bearing solution with a precipitant selected from the group of water-soluble salts consisting of sodium and ammonium fluorides, sodium and ammonium phosphates, sodium and ammonium salts of fatty acids, sodium silicates and aluminates. For example, addition of ammonium fluoride effects the precipitation of lithium fluoride and at the same time regenerates the major part of the ammonium carbonate spent in the leaching step. A similar condition prevails with the other anions. This procedure is particularly effective in a cyclic process.

The preferred calcined lithium-bearing silicate is beta-spodumene. However, other calcined lithium-bearing silicates may be employed of which the following are given as examples with their minimum calcining temperatures—petalite (680° C.), eucryptite (980° C.), and lepidolite (850° C.). Alpha-spodumene is calcined to the beta form at a temperature above about 870° C.

The invention has been generally described, and it will now be illustrated in more detail by reference to the following examples.

Examples 1 to 19

Tables I and II were run in such a way as to make them comparative. In all instances, the lithium-bearing charge was a fine grain calcined spodumene concentrate containing 4.5% $Li_2O$ (corresponding approximately to a mixture of 60% beta-spodumene, 25% feldspars and 15% quartz). The weights of sodium carbonate used in the decomposing step were calculated after the lithium oxide content of the charge. The stoichiometric amount required being 15.9 parts of $Na_2CO_3$ for each 100 parts of the above concentrate (all parts are by weight) the effect of using various excesses of sodium carbonate ranging from 2.5 to 7 times the stoichiometric amount required is shown in Tables I and II.

The decomposition of beta-spodumene through reaction with aqueous sodium carbonate was effected under constant agitation at the temperature and for the length of time mentioned in the tables, in the presence of water in an amount never substantially more than sufficient to keep the sodium carbonate in concentrated solution at or near saturation point. The hot aqueous slurry containing the reaction product was then filtered. An analysis of the solid residue revealed that in all tests the original beta-spodumene had been converted to lithium carbonate and anisometric sodic zeolite at least to a very large extent. The filtered solid residue was then repulped and leached at room temperature with water containing either carbon dioxide or ammonium bicarbonate.

The filtered solid residue was repulped at room temperature with an aqueous solution of ammonium bicarbonate, in an amount about 20 times the weight of the $Li_2O$ present in the silicate, and water being in an amount about 10 times the weight of the starting spodumene concentrate (both water and ammonium salt being in considerable excess over what was required for dissolving the lithium carbonate). After about five minutes contact, the resulting light slurry was filtered and the remaining solid residue washed again at room temperature with water alone, in an amount corresponding approximately to the weight of the residue.

In Examples 4 and 7, the filtered solids from the decomposing step were repulped with an amount of water about 3 times the weight of the starting material and leached for about one hour at a temperature of about 25° C., while bubbling carbon dioxide through the resulting slurry. Then the leached product was filtered. Here the leached residual anisometric zeolite contains as much sodium as the one obtained at the decomposing step since the sodium extraction therefrom is not possible with aqueous carbon dioxide alone. This sodic zeolite has excellent ion-exchanging properties.

TABLE I.—DECOMPOSING AT ATMOSPHERIC PRESSURE

[Effect of various factors on lithium extraction and on sodium regeneration]

| Example | Decomposing | | | Leaching Results [1] | |
|---|---|---|---|---|---|
| | Reactant $Na_2CO_3$ (parts) | Conditions | | Lithium extracted, percent | Sodium regenerated, percent |
| | | Temp., °C. | Time (hours) | | |
| 1 | 63.6 | 90-95 | 96 | 92 | 81 |
| 1-A | 63.6 | 90-95 | 72 | 91 | 74 |
| 2 | 79.5 | 90-95 | 72 | 91 | 82 |
| 2-A | 79.5 | 90-95 | 96 | 93 | 91 |
| 3 | 47.7 | 95-100 | 96 | 83 | 78 |
| 3-A | 79.5 | 95-100 | 96 | 95 | 88 |
| 3-B | 79.5 | 95-100 | 72 | 93 | 81 |
| 4 | 95.4 | 95-100 | 48 | 86 | |
| 5 | 95.4 | 95-100 | 96 | 95 | 94 |
| 6 | 63.6 | 100-105 | 48 | 93 | 83 |
| 7 | 95.4 | 100-105 | 24 | 83 | |
| 8 | 95.4 | 100-105 | 72 | 91 | 98 |

[1] Leaching was effected with aqueous ammonium bicarbonate in all examples except 4 and 7 where the leaching was made with aqueous carbon dioxide.

TABLE II.—DECOMPOSING AT SUPER ATMOSPHERIC PRESSURE

[Effect of various factors on lithium extraction and on sodium regeneration]

| Example | Decomposing | | | Leaching Results | |
|---|---|---|---|---|---|
| | Reactant $Na_2CO_3$ (parts) | Conditions | | Lithium extracted, percent | Sodium regenerated, percent |
| | | Temp., °C. | Time (hours) | | |
| 9 | 79.5 | 110-115 | 13½ | 86.5 | 93 |
| 10 | 39.75 | 115-120 | 24 | 85.3 | 76 |
| 11 | 63.6 | 115-120 | 18 | 88.2 | 62.5 |
| 12 | 79.5 | 115-120 | 24 | 86 | 55 |
| 13 | 79.5 | 115-120 | 48 | 91 | 40 |
| 14 | 47.7 | 120-125 | 24 | 80.1 | 70 |
| 15 | 111.3 | 120-125 | 24 | 90.7 | 48 |
| 16 | 47.7 | 125 | 24 | 87.8 | 66 |
| 17 | 79.5 | 125 | 24 | 90.3 | 56 |
| 18 | 111.3 | 125 | 18 | 90 | 32 |
| 19 | 111.3 | 125 | 24 | 93 | 33 |

The examples show that the higher the temperature of formation of the anisometric sodic zeolite (the companion end-product predominantly formed in all tests) the more difficult is the generation of sodium from said zeolite. When high sodium carbonate excess (i.e. more than about 5 times the stoichiometric amount) is used at a temperature between about 120° C. and about 125° C., the anisometric sodic zeolite formed does not exchange more than about 55% of its sodium for ammonium when leached with aqueous ammonium bicarbonate, whereas when same zeolite is formed with the temperature range from about 95° C. to about 105° C., it does exchange readily up to about 98% of its sodium content. This is contrary to expectation, since the X-ray diffraction pattern and the chemical analysis of this zeolite appears to be practically the same in all tests. This zeolite seems to respond approximately to the following chemical formula: $Na_2O.Al_2O_3.2SiO_2.yH_2O$.

In United States Patents 3,112,171 and 3,131,022 it has been shown in detail how to operate related processes in a cyclic and sometimes regenerative manner. Analogous procedures are particularly applicable to use in combination with new individual steps disclosed herein, such combinations forming part of the present invention. However, when producing lithium carbonate as disclosed in the above-mentioned patents, calories were required to drive off the leaching promoters in a gaseous form and to precipitate hot lithium carbonate, whereas frigories had to be supplied to cool the hot mother liquor after lithium carbonate separation, prior to its re-use in the cold leaching step. Power was also required to recover the leaching promoter and to return it to the leaching step.

The applicant has now found a method of closing the circuit of the cyclic process without that important expense of calories, frigories, power etc., by resorting to an ambient temperature precipitation of lithium (preferably from about 0° C. to about 40° C.) through the use of water-soluble anion-bearing compounds, such anions being those of hydrofluoric acid, phosphoric acid, silicic acids, aluminic acids or fatty acids. The prior art apparently has never succeeded in practicing such a precipitation industrially from the raw leach solution obtained immediately after spodumene had been decomposed. This is now possible because of the applicant's specific method of decomposing in combination with his specific method of leaching.

When practicing on an industrial scale the precipitation of the above lithium salts which are less water-soluble than the carbonate contrary to expectation there is no difficulty since the pregnant lithium-bearing solutions do not contain substances that can contaminate the solid lithium salts produced by the addition of the anion-bearing compounds mentioned above.

In carrying out the procedure just described with the use of water-soluble anion-bearing compounds, the following are examples of compounds which can be used. Any water-soluble salt of the acids mentioned, can be employed, preferably the sodium or ammonium salts. Among the fatty acids which can be used are oleic, stearic, palmitic. Alternatively, hydrofluoric and phosphoric acids can be employed, instead of the salts. The amounts employed should be stoichiometric or near to stoichiometric.

I claim:

1. A cyclic and integrated continuous process for producing lithium carbonate and an ion exchanging zeolite from calcined lithium-bearing aluminosilicate, which comprises the steps of (a) decomposing said aluminosilicate hydrothermically with sodium carbonate in an amount from about 2 to about 8 times the stoichiometric amount, necessary to react with the lithium, in the presence of water in an amount from about 1 to about 4 times the weight of the starting aluminosilicate, at a temperature within the range from about 85° C. to about 125° C., at a pressure from about atmospheric to about 15 p.s.i.g., and for a period of time from about 0.5 day to about four days, to form a hot aqueous slurry of solids; (b) separating said solids from said hot aqueous slurry; (c) leaching said dewatered solids with cold water containing a leaching promoter selected from the group consisting of carbon dioxide and ammonium carbonate, to recover their lithium contents in a solution form, separating therefrom said zeolite; (d) heating and agitating said solution to insolubilize its lithium content and to evolve its leaching promoter as a gas; (e) recycling said gas to the leaching step; (f) recovering separately a high grade lithium carbonate and said zeolite.

2. A cyclic and integrated continuous process for producing lithium carbonate and an ammoniated zeolite from calcined lithium-bearing aluminosilicate, with concomitant regeneration of the treating agents, which comprises the steps of: (a) decomposing said aluminosilicate hydrothermically with sodium carbonate in an amount from about 3 to 7 times the stoichiometric amount necessary to react with the lithium, in the presence of water in an amount from about 1 to about 4 times the weight of the starting material, at a temperature within the range from about 90° C. to about 120° C., at a pressure from about atmospheric to about 15 p.s.i.g. and for a period of time from about 1 day to about 3.5 days, to produce thereby an aqueous slurry containing as solids lithium carbonate and anisometric sodic zeolite; (b) separating said solids from hot aqueous slurry; (c) leaching said dewatered solids by contacting them at a temperature from about 0° C. to about 40° C. with an aqueous solution of an ammonium salt of carbonic acid, said ammonium salt being in an amount from about 3 to about 20 times the weight of the lithium oxide present to solubilize the lithium content and to extract the sodium from the zeolite produced, regenerating the sodium carbonate required in the decomposing step; and separating the solid residue containing an hydrated ammoniated zeolite from the lithium carbonate-bearing solution; (d) insolubilizing the lithium content of the solution obtained in the leaching step by heating and agitating said solution at a temperature from about 60° C. to about 100° C. to drive off carbon dioxide and ammonia gases, separating crystalline lithium carbonate from the mother liquor, and returning the mother liquor to the decomposing step; (e) recovering separately a high-grade lithium carbonate and said ammoniated zeolite, which was produced at the leaching step.

3. A cyclic process for producing lithium carbonate and an anisometric sodic zeolite from calcined lithium-bearing aluminosilicate, which comprises the steps of: (a) decomposing said aluminosilicate hydrothermically with sodium carbonate in an amount from about 2 to about 8 times the stoichiometric amount based on the lithium present, in the presence of water in an amount from about 1 to about 4 times the weight of the starting material, at a temperature within the range from about 85° C. to about 125° C. at a pressure from about atmospheric to about 15 p.s.i.g. and for a period of time from about 0.5 day to about four days, to produce an aqueous slurry containing as solids lithium carbonate and anisometric sodic zeolite; (b) separating said solids from said hot aqueous slurry; (c) leaching the dewatered solids by contacting them at a temperature from about 0° C. to about 40° C. with water containing carbon dioxide as leaching promoter to solubilize the lithium carbonate in water; separating the solid residue containing a practically lithium free anisometric sodic zeolite from the lithium-bearing solution; (d) heating and agitating said solution at a temperature from about 60° C. to about 100° C. to drive off carbon dioxide gas, separating crystalline lithium carbonate from the mother liquor, returning the mother liquor to the decomposing step; (e) and recovering separately a high-grade lithium carbonate and said anisometric sodic zeolite.

4. A process for producing anisometric sodic zeolite and a lithium salt from calcined lithium-bearing aluminosilicate, which comprises: contacting said aluminosilicate with aqueous sodium carbonate in an amount in excess of the stoichiometric amount required by the lithium present in the aluminosilicate under hydrothermic conditions at a pressure from about atmospheric to about 15 p.s.i.g. and at a temperature from about 60° C. to about 125° C. to form an aqueous mixture containing as solids anisometric sodic zeolite and hot water-in-soluble lithium carbonate; separating unspent sodium carbonate liquor from said aqueous mixture of solids; treating said separated mixture of solids with a cold saturated aqueous solution of carbon dioxide to solubilize lithium carbonate; filtering the solid anisometric sodic zeolite from the lithium-bearing solution; treating the filtrate with a water-soluble compound selected from the group consisting of sodium fluoride, ammonium fluoride, hyrofluoric acid, phosphoric acid, silicic acid, aluminic acid, palmitic acid, stearic acid, and oleic acid to precipitate the corresponding lithium salt; and recovering separately the solid lithium salt and said anisometric sodic zeolite.

5. A process for deriving from calcined lithium-bearing aluminosilicate an ion exchanging zeolite and lithium carbonate, comprising, heating said aluminosilicate under agitation with a solution consisting of aqueous sodium carbonate in excess of the stoichiometric amount required by the lithium present in the aluminosilicate under solid-liquid contact conditions at a pressure within the range from atmospheric to about 15 p.s.i.g. and a temperature within a range from about 60° C. to about 125° C. whereby substantially all the starting aluminosilicate is converted into ion exchanging zeolite and lithium carbonate thereby providing a mixture of said ion exchanging zeolite and lithium carbonate.

6. In a process for deriving from calcined lithium-bearing aluminosilicate an anisometric sodic zeolite and lithium carbonate, the improvement comprising, heating said aluminosilicate under agitation with a solution consisting of aqueous sodium carbonate in excess of the stoichiometric amount required by the lithium present in the aluminosilicate under solid-liquid contact conditions at a pressure within the range from atmospheric to about 15 p.s.i.g. and at a temperature within the range from about 60° C. to about 125° C. whereby substantially all the starting aluminosilicate is converted into anisometric sodic zeolite and lithium carbonate thereby providing a mixture of said anisometric sodic zeolite and lithium carbonate as solids and mother liquor, separating the mother liquor from the solids in the hot aqueous mixture, cooling the dewatered solids, adding cold water containing at least one leaching promoter selected from the group consisting of carbon dioxide and ammonium carbonate thereby solubilizing the lithium, separating the resulting lithium-bearing solution from the anisometric sodic zeolite, and recovering the lithium contained in the solution.

7. A process, as defined in claim 6, in which the sodium carbonate is present in an amount from about 2 to about 8 times the stoichiometric amount, the water is present in an amount from about 1 to about 4 times the weight of the starting silicate, the temperature is above about 85° C. and the time is from about one-half day to about four days.

References Cited by the Examiner

UNITED STATES PATENTS

| 3,112,170 | 11/1963 | Archambault et al. | 23—33 |
| 3,112,171 | 11/1963 | Archambault | 23—63 |
| 3,112,172 | 11/1963 | Archambault et al. | 23—63 |
| 3,131,022 | 4/1964 | Archambault | 23—63 |

OSCAR R. VERTIZ, *Primary Examiner.*

BENJAMIN HENKIN, *Examiner.*

G. T. OZAKI, *Assistant Examiner.*